US006567671B2

(12) United States Patent
Amin

(10) Patent No.: US 6,567,671 B2
(45) Date of Patent: *May 20, 2003

(54) WIRELESS COMMUNICATION DEVICE WITH CALL SCREENING

(75) Inventor: Umesh J. Amin, Redmond, WA (US)

(73) Assignee: AT&T Wireless Services, Inc., Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/909,387

(22) Filed: Aug. 11, 1997

(65) Prior Publication Data

US 2001/0051534 A1 Dec. 13, 2001

(51) Int. Cl.[7] .............................. H04B 1/38; H04M 1/00
(52) U.S. Cl. ....................................... 455/550; 455/415
(58) Field of Search ................................ 455/567, 415, 455/414, 417, 422, 403, 445, 461, 550, 418–419; 379/210.02, 210.03

(56) References Cited

U.S. PATENT DOCUMENTS

| | | | |
|---|---|---|---|
| 5,327,144 A | | 7/1994 | Stilp et al. |
| 5,329,578 A | * | 7/1994 | Brennan et al. ............ 455/461 |
| 5,388,147 A | | 2/1995 | Grimes |
| 5,473,671 A | | 12/1995 | Partridge, III |
| 5,479,482 A | | 12/1995 | Grimes |
| 5,506,887 A | | 4/1996 | Emery et al. |
| 5,515,043 A | | 5/1996 | Berard et al. |
| 5,519,760 A | | 5/1996 | Borkowski et al. |
| 5,548,636 A | * | 8/1996 | Bannister et al. ........... 455/461 |
| 5,742,905 A | * | 4/1998 | Pepe et al. .................. 455/417 |
| 5,758,281 A | * | 5/1998 | Emery et al. ............... 455/428 |
| 5,926,756 A | * | 7/1999 | Piosenka et al. ............ 455/418 |
| 5,940,752 A | * | 8/1999 | Henrick ...................... 455/419 |
| 5,949,775 A | * | 9/1999 | Rautiola et al. ............. 370/338 |

FOREIGN PATENT DOCUMENTS

| | | |
|---|---|---|
| CA | 2141480 | 8/1998 |
| WO | 94/30023 | * 12/1994 |

OTHER PUBLICATIONS

FCC Docket No. 94–102, "Compatibility of Wireless Services with Enhanced 911," Federal Register, vol. 61, No. 37, pp. 6963–6964 (Feb. 23, 1996).

Press Release DC 96–52, "FCC Adopts Rules to Implement Enhanced 911 for Wireless Services," FCC Docket No. 94–102 (Jun. 12, 1996).

Jameson et al., "Low Cost, Enhanced Emergency Telephone System," Proc. SPIE Telecommunication for Health Care, Abstract, 2 pp. (1990).

* cited by examiner

Primary Examiner—Nguyen T. Vo
(74) Attorney, Agent, or Firm—Klarquist Sparkman, LLP

(57) ABSTRACT

A cellular telephone maintains a screening list of calling party numbers, and specifies call handling therefor. A mobile switching center is responsive to selected types of the specified call handling. The call handling can depend on whether the call is local or non-local, which is affected by the location of the cellular telephone. The call handling can also depend on the time at which the call is made. A subscriber updates his or her screening list via personal computer, and transmits via a communication network the updated screening list to a message center which sends the updated screening list to the cellular telephone via wireless communication. A calling party number can be specified as a wildcard.

41 Claims, 4 Drawing Sheets

| 502 | 504 | 505 | 506 | 508 |
|---|---|---|---|---|
| CALLING PARTY NUMBER | CALLING PARTY NAME | CALLING PARTY LOCATION | LOCAL CALL HANDLING | NON-LOCAL CALL HANDLING |

| CALLING PARTY NUMBER | NAME | LOCATION | LOCAL CALLS | NON-LOCAL CALLS |
|---|---|---|---|---|
| 702 — 212 123 4567 | | | ACCEPT | ACCEPT IF TOD BETWEEN 9AM, 5PM ELSE FORWARD TO 2021113333 |
| 704 — 201 656 1000 | CHRIS | | ACCEPT | ACCEPT |
| 706 — 202 456 8888 | | | ACCEPT IF TOD BETWEEN 7PM, 11PM ELSE DENY | ACCEPT IF SAT OR SUN ELSE FORWARD TO 2021113333 |
| 708 — 206 *** **** | | SEATTLE | ACCEPT | ACCEPT |
| 710 — 206 *** **** | | NOT SEATTLE | CALL-BY-CALL FORWARDING DEFAULT 7164449999 | CALL-BY-CALL FORWARDING DEFAULT 2021113333 |
| 712 — *** *** **** | | | ACCEPT | ACCEPT IF CALLER WILL PAY ELSE DENY |

WIRELESS COMMUNICATION DEVICE WITH CALL SCREENING

BACKGROUND OF THE INVENTION

The present invention relates to a wireless communication device, and, more particularly, is directed to a wireless communication device which screens incoming calls according to information stored therein and which exercises limited control over a wireless communication network in accordance with the screening list.

U.S. Pat. No. 5,473,671 (Partridge, III) is directed to a system which maintains a list of caller identities and the type of call treatment that an incoming call to a cellular telephone should receive based on the identity of the caller. The list may be stored in the telephone company's switching facilities or in the subscriber's wireline telephone system. If an incoming call is acceptable, it is forwarded to the cellular telephone. Otherwise, the caller is offered the option to pay for the call. An incoming call may acquire different status in response to an interaction between the calling party and the system.

The call may be treated differently depending on the whether the called party is at a cellular telephone.

A subscriber to the service described in U.S. Pat. No. 5,473,671 uses an interactive voice response system to add or remove telephone numbers from the subscriber's list via voice recognition or telephone key entry.

While the above-described system is useful, it lacks flexibility in handling certain calls. It is also cumbersome for the subscriber to maintain the subscriber's list.

SUMMARY OF THE INVENTION

In accordance with an aspect of this invention, a cellular telephone includes a memory for storing a screening list specifying calling party numbers and associated call handling, and a processor for responding to an incoming call in accordance with the screening list.

The call handling may depend on the location of the cellular telephone, the calling party name, the time of day at which the incoming call is received, the day of the week at which the incoming call is received, or may be specified on a call-by-call basis.

A portion of the calling party number may be specified in the screening list as a wildcard.

The screening list can be generated by a subscriber using a personal computer and is delivered to the cellular telephone via a wireless communication channel.

In accordance with another aspect of this invention, a method for providing a screening list for a cellular telephone specifying calling party numbers and associated call handling comprises receiving the screening list from a communication network, and delivering the screening list to the cellular telephone via a wireless communication channel.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 4 is a chart depicting a screening list; and

DETAILED DESCRIPTION OF THE PREFERRED EMBODIMENTS

Figures 1, 2:
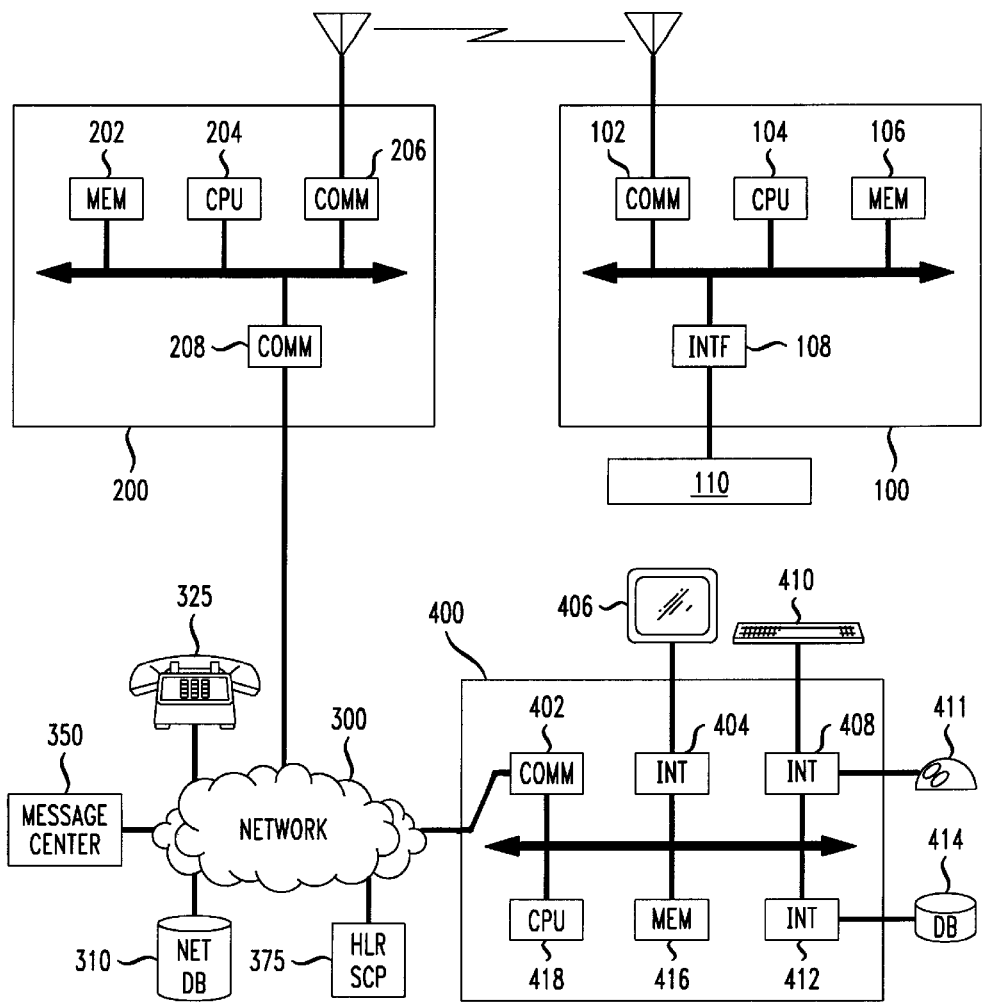
FIG. 1 illustrates a communication system according to the present invention.
FIG. 2 illustrates a data record of a screening list maintained in cellular telephone 100 of FIG. 1.

This invention enables a telecommunications services subscriber to program a telecommunications network to provide a personalized service configuration. The invention contemplates a robust network which is automatically configured in part in accordance with the subscriber's programmed instructions. In effect, the subscriber acts as his or her own network administrator, directly configuring the network in accordance with selections from an option menu, and able to change his or her selections through an automated interface. The automated interface may include a personal computer located at the subscriber premises.

In contrast, in conventional networks, a network administrator defines a limited set of options, the subscriber selects from among this limited set, and the network administrator then implements the subscriber's selections.

In accordance with the invention, a subscriber-controlled network interface accepts instructions from a subscriber, such as selections from a menu of options, and configures the network in accordance with the subscriber provided instructions to deliver services requested by the subscriber. The interface may be connected to one or more network elements such as stored program control switches, network databases, signalling nodes, service control points, adjunct processors, intelligent peripherals, billing elements and so on. The interface may prompt the subscriber, presenting available options from which the subscriber can select desired services or service options. The network is automatically configured by the interface, in accordance with the subscriber instructions.

An example of a selection is to block (or permit) calls from a designated geographical area. Another example of a selection is to turn off a service, such as call waiting, during a designated time interval. A further example of a selection is to require a caller to accept all long-distance charges for calls during a designated time interval.

In some embodiments of the invention, options presented to the subscriber are not universal but rather are determined by characteristics associated with the subscriber, such as, for example, credit worthiness, usage or location.

In one embodiment according to the present inventive technique, a cellular telephone maintains a screening list of calling party numbers, and specifies call handling therefor. The call handling can depend on whether the call is local or non-local, which is affected by the location of the cellular telephone. The call handling can also depend on the time at which the call is made. A subscriber updates his or her screening list via personal computer, and transmits via a communication network the updated screening list to a message center which sends the updated screening list to the cellular telephone via wireless communication.

Because the cellular telephone stores the screening list, the subscriber need not have a complicated wireline system which intercepts calls to the cellular telephone for call screening.

Since the screening list can become quite complicated, it is convenient for the subscriber to have a large visual display, which is provided by a personal computer but which is not available through an interactive voice response system or through a display on a handheld unit such as a telephone.

Referring now to the drawings, and in particular to FIG. 1, there is illustrated a communication system according to the present invention including cellular telephone 100, MSC 200, communication network 300, calling party telephone 325, message center 350, home location register service control point (HLR SCP) 375 and personal computer 400. The cellular concept is well known and is described in general in the *Bell System Technical Journal,* Volume 58, Number 1, January 1979, and specifically in an article entitled *The Cellular Concept* by V. H. MacDonald, on pages 15 through 41 of this journal, the disclosure which is hereby incorporated by reference.

Cellular telephone 100 includes wireless communication interface 102, processor 104, memory 106, display interface 108 and display 110, which may be, for example, a liquid crystal display (LCD) able to display several lines of alphanumeric or graphics characters. A screening list is stored in memory 106. The screening list comprises records as shown in FIG. 2.

MSC 200 includes memory 202, processor 204, wireless communication interface 206 and wireline communication interface 208.

Communication network 300 functions to accept transmissions from personal computer 400 and to deliver the transmissions to MSC 200. Communication network 300 encompasses, for example, the public switched telephone network (PSTN), dedicated communications lines accessible to MSC 200, and the Internet. Network database 310 is coupled to communication network 300 via suitable processors (not shown), and serves to store customer information, such as services activated for a customer.

Message center 350 is a store and forward device including a processor, memory and communications interface adapted to, inter alia, receive a message from personal computer 400 destined for cellular telephone 100, to query HLR SCP 375 to determine whether cellular telephone 100 is active and registered, and to send the message for cellular telephone 100 to MSC 200 when cellular telephone 100 is registered therewith and is active. Message center 350 is also adapted to receive a message acknowledgment originated by cellular telephone 100 and forwarded by MSC 200 to message center 350. Message center 350 is also referred to as an intelligent peripheral or an adjunct processor. Another example of an intelligent peripheral is a voice mail system.

HLR SCP 375 serves to maintain a log of all devices registered with mobile switching centers, such as MSC 200, and whether such registered devices are active. HLR SCP 375 also functions to accept queries regarding the status of a device and to return responses reporting on the status of the device.

Personal computer 400 includes communication interface 402 such as a wireline or wireless modem or local area network interface 404, display interface 406, keyboard interface 408, keyboard 410, pointing device (mouse) 411, storage interface 412, data storage 414, memory 416 and processor 418. Data storage 414 is adapted to store specialized software, which is read into memory 416 for use by processor 418, and which is described further below.

FIG. 2 shows a record 500 of the screening list. Record 500 includes calling party number field 502 for representing a calling number identifier (CNI), calling party name (CPN) field 504, calling party location field 505, local call handling field 508 and non-local call handling field 510.

Figure 3:
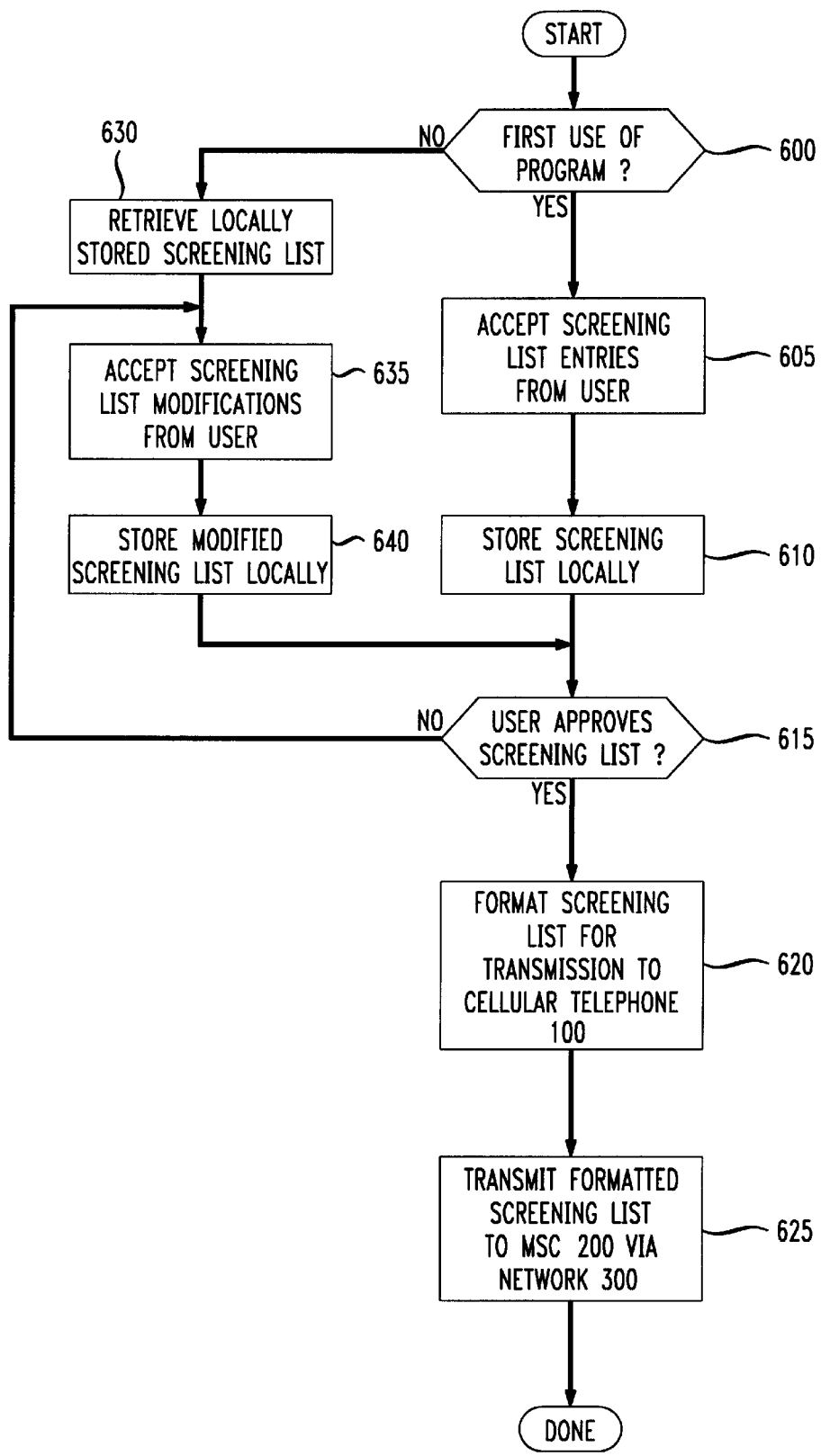
FIG. 3 is a flowchart illustrating operation of a screening list creation program.

A subscriber interacts with a screening list on personal computer 400 using a screening list creation program provided by the cellular communication service provider through downloading via communication network 300 or delivery of a data disk to personal computer 400. FIG. 3 is a flowchart illustrating the operation of the screening list creation program. Generally, the program displays a screening list in table form, as shown in FIG. 4, and enables the subscriber to add entries, modify entries and delete entries to the screening list using a window driven interface including point-and-click mouse based navigation. For the calling party name and location, the Boolean operator NOT can be used to provide further screening list flexibility, as described below.

When the subscriber executes the screening list creation program, at step 600, the program determines whether this is a first use of the program.

If the screening list creation program is being used for the first time, at step 605, the program provides a table-like template for calling party identification and call disposition. The subscriber specifies at least one calling party number, how a call from the calling party number should be handled if it is local, and how the call should be handled if it is non-local. Whether a call is local or non-local depends on the location of cellular telephone 100 relative to the location of the calling party number.

Call handling options generally include: (1) accept, (2) accept only if calling party will pay for call otherwise deny, (3) accept only if calling party will pay for call otherwise forward to a voice mailbox, (4) deny, (5) forward to another telephone number, (6) forward to a voice mailbox, and (7) request a call-by-call determination from the subscriber, typically by displaying the calling party number, name and cost estimate for the incoming call on a display (not shown) provided by cellular telephone 100, providing an audible indication that there is an incoming call, and waiting for the subscriber to press a first key selection, such as SEND, to accept the call, a second key selection, such as END, to reject the call, or a third key selection, such as *F, to forward the call to a voice mailbox. If no response is received within a predetermined time, conventional network procedures for unanswered calls are invoked.

In call handling options (2) and (3), network 300 serves to interact with the calling party to determine whether the calling party will pay for all costs associated with the call, such as via generating speech or playing stored speech segments to the calling party, and recognizing dual tone multi-frequency (DTMF) or spoken signals from the calling party.

Furthermore, call handling options can be specified according to day of the week and/or time of day.

If the subscriber wishes to treat all callers who are otherwise unspecified in the same manner, then a "wildcard" calling party number can be entered for all or part of a calling party number, such as "** * ****". This is particularly helpful in enabling a subscriber to control cellular telephone usage charges.

Record 702 in FIG. 4 illustrates non-local call handling depending on time of day.

Record 704 in FIG. 4 illustrates use of a calling party name. In this example, the calling party number is a business number, and the business has a private branch exchange (PBX). As is well known, the PBX appends caller name information to the call set-up information. Caller identification information is generally available.

Record 706 in FIG. 4 illustrates local call handling depending on time of day and non-local call handling depending on day of the week.

Record 708 in FIG. 4 illustrates designation of a calling party number which is a cellular telephone, and use of the calling party location field to further identify the calling party.

Record 710 in FIG. 4 illustrates use of call-by-call treatment, and use of "NOT" to indicate all locations except Seattle.

Record 712 in FIG. 4 illustrates wildcard treatment for non-local callers who are otherwise unspecified.

At step 610 of FIG. 3, personal computer 400 stores the screening list locally, such as by using disk storage 414, and sets an internal flag indicating that the screening list creation program has been used.

At step 615, the subscriber approves the screening list for downloading into cellular telephone 100, typically by electronically pointing at an appropriately labelled area of an image displayed on display 406 using a mouse or other pointing device and clicking thereon.

At step 620, the program formats the screening list for transmission to cellular telephone 100, such as by compressing the data in the screening list and parsing the list into a plurality of segments which may be appropriately sized for, e.g., a fixed length transmission such as IS 136 short message service (SMS). At step 625, the program transmits the formatted screening list to message center 350 for transmission to cellular telephone 100 and completes its execution.

If the screening list creation program has been used before, at step 630, the screening list most recently downloaded into cellular telephone 100 is retrieved from disk storage 414. Alternatively, cellular telephone 100 can be commanded to transmit its stored screening list, which is delivered to message center 350, and sent therefrom to personal computer 400. This is also useful as a backup procedure to retrieval from disk storage 414, and avoids a need for message center 350 to store screening lists for a large number of cellular telephones.

At step 635, modifications to the screening list are accepted from the subscriber. This is particularly convenient for the subscriber, as it eliminates the need to re-enter the entire screening list.

At step 640, personal computer 400 stores the modified screening list, and control passes to step 615.

In another embodiment, call handling is based on whether the call originates from a business telephone number or a residential telephone number, rather than whether the calling party is local or non-local. In this embodiment, network 300 includes sufficient information to make this distinction, in the same manner as caller i.d. information is presently provided.

Figure 5:
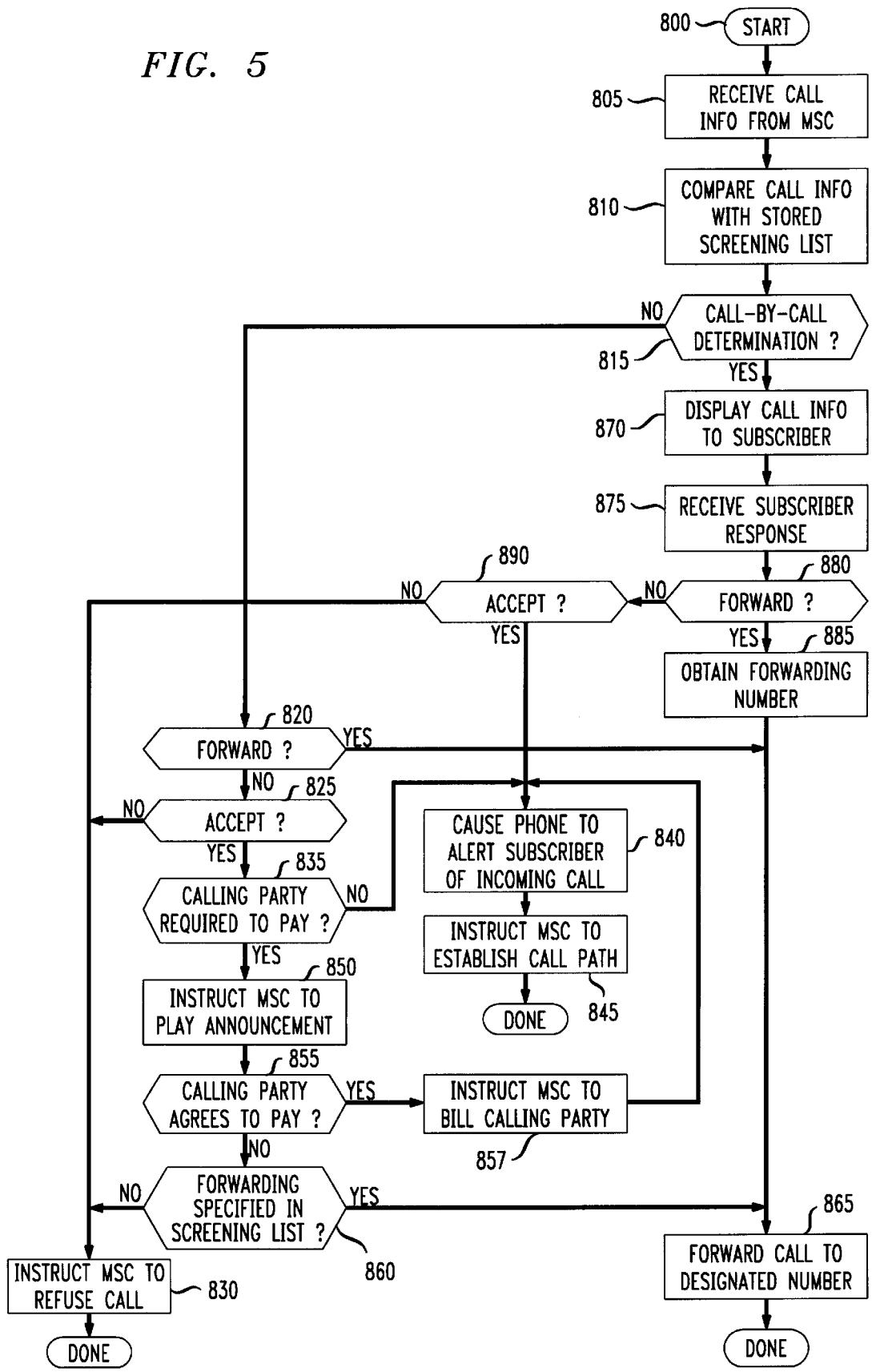
FIG. 5 is a flowchart illustrating operation of cellular telephone 100 in accordance with a screening list stored therein.

FIG. 5 is a flowchart illustrating operation of cellular telephone 100 when a screening list is stored therein. Initially, MSC 200 receives a call setup request generated by a user of calling party telephone 325 including call information, typically the call origination location, the automatic number identification (ANI) of the call (i.e., the telephone number of the calling party), and the name of the calling party. MSC 200 sends the call information to cellular telephone 100. If cellular telephone 100 fails to respond within a predetermined time, MSC 200 responds in a conventional manner, such as by playing a "no response" announcement to the calling party.

If cellular telephone 100 is active, at step 805, cellular telephone 100 receives the call information sent from MSC 200. At step 810, processor 104 of cellular telephone 100 compares the call information with the screening list in memory 106 to determine how to respond to the incoming call.

At step 815, processor 104 determines whether the incoming call should be handled on a call-by-call determination basis by the subscriber. For example, assuming the screening list shown in FIG. 4, if the ANI of the incoming call has an area code of "206" and the call origination location is other than Seattle, then the incoming call should be handled on a call-by-call determination basis by the subscriber.

If the determination at step 815 is negative, then processor 104 proceeds to step 820.

At step 820, processor 104 determines whether the incoming call should be forwarded. For example, assuming the screening list shown in FIG. 4, if the ANI of the incoming call is "202 456 8888", the call origination location is non-local and the day of the week is Monday-Friday, then the incoming call should be forwarded to "202 111 3333".

If the determination at step 820 is negative, then processor 104 proceeds to step 825.

At step 825, processor 104 determines whether the incoming call should be accepted. For example, assuming the screening list shown in FIG. 4, if the ANI of the incoming call is not otherwise specified, i.e., "* * ****", then the incoming call should be accepted. As another example, if the ANI of the incoming call is "202 456 8888" and the time of day is other than between 7 p.m. and 11 p.m., then normal call handling should follow for the incoming call.

If the determination at step 825 is negative, then processor 104 proceeds to step 830.

At step 830, processor 104 instructs MSC 200 to refuse the call. In one embodiment, MSC 200 responds by processing the call according to the profile, such as by playing a "no response" announcement to the calling party or by playing a special announcement, such as "the called party refused your call". At this point, processing of the incoming call setup request by cellular telephone 100 is complete.

If the determination at step 825 is positive, then processor 104 proceeds to step 835.

At step 835, processor 104 determines whether the calling party needs to pay in order for the call to be accepted. For example, assuming the screening list shown in FIG. 4, if the ANI of the incoming call is not otherwise specified, i.e., "* * ****" and the incoming call is non-local, then the calling party must pay for the call in order for cellular telephone 100 to accept it.

If the determination at step 835 is negative, then processor 104 proceeds to step 840.

At step 840, processor 104 causes cellular telephone 100 to alert the associated subscriber that there is an incoming call, such as by ringing, flashing a light, displaying a message on display 110, vibrating and so on. Means for causing the alerting are known to one of ordinary skill in the art, and are not shown for simplicity in the figures. At step 845, processor 104 instructs MSC 200 to establish the call path. The order of steps 840 and 845 may be reversed. At this point, processing of the incoming call setup request by cellular telephone 100 is complete.

If the determination at step 835 is positive, then processor 104 proceeds to step 850.

At step 850, processor 104 instructs MSC 200 to play an announcement to the calling party requesting that the calling party agree to assume charges for the call, such as, The called party will accept your call only if you agree to pay call charges. Press * to accept charges, or press # to refuse charges.

At step 855, cellular telephone 100 receives a message from MSC 200 indicating whether the calling party has agreed to accept the charges for the call. If this is the case, then at step 857, processor 104 instructs MSC 200 to bill the calling party for the cost of the call. Processor 104 then proceeds to step 840, described above.

If the calling party has not agreed to accept call charges, that is, has refused charges, then processor 104 proceeds to step 860 and determines whether the incoming call should be forwarded.

If the determination at step 860 is negative, then processor 104 proceeds to step 830, described above, and refuses the call.

If the determination at step 865 is positive, then processor 104 proceeds to step 865 and forwards the incoming call to the call forwarding number designated in the screening list stored in memory 106. At this point, processing of the incoming call setup request by cellular telephone 100 is complete.

If the determination at step 820 is positive, then processor 104 proceeds to step 865, as described above.

If the determination at step 815 is positive, then processor 104 proceeds to step 870.

At step 870, processor 104 causes cellular telephone 100 to display the incoming call information to the subscriber on display 110, along with a message such as, Press * to accept, 0 to refuse or # to forward.

In other embodiments, cellular telephone 100 may play a stored or speech synthesized announcement to the subscriber.

At step 875, cellular telephone 100 receives a response from the subscriber.

At step 880, processor 104 determines whether the subscriber has indicated call forwarding. If so, then at step 885, processor 104 displays a message to the subscriber on display 110, such as, Please enter number for call forwarding, or press * for forwarding to voice mailbox.

Herein, it is assumed that the subscriber has specified a default call forwarding number for the call-by-call treatment. For example, assuming the screening list shown in FIG. 4, if the ANI of the incoming call has an area code of "206" and the call origination is other than Seattle, then the call forwarding default depends on whether the call is local or non-local. After the forwarding number is obtained at step 885, processor 104 proceeds to step 865, described above.

If the determination at step 880 is that the subscriber has not indicated call forwarding, then processor 104 proceeds to step 890, and determines whether the subscriber has accepted the call. If so, processor 104 proceeds to step 840, described above. If the subscriber has not accepted the call, then processor 104 proceeds to step 830, described above.

As explained above, cellular telephone 100 exercises a limited amount of control over MSC 200 when cellular telephone 100 is operative according to a screening list stored therein. For example, at step 830, cellular telephone 100 instructs MSC 200 to refuse a call; at step 850, cellular telephone 100 instructs MSC 200 to play a charge acceptance announcement; at step 857, cellular telephone 100 instructs MSC 200 to bill the calling party for the call; and at step 865, cellular telephone 100 instructs MSC 200 to forward the incoming call to a designated number.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for providing a screening list for a cellular communication device specifying calling party numbers and associated call handling, comprising:

receiving the screening list via a wireline communication channel from a personal computer at a subscriber's premises, wherein said screening list is configured or updated from said personal computer;

if the cellular communication device is active and registered with a telecommunications network, delivering the screening list to the cellular communication device via a wireless communication channel for storage of the screening list in the cellular communication device, wherein the cellular communication device automatically responds to incoming calls in accordance with the screening list; and otherwise, storing the screening list in a database of the telecommunications network until the cellular communication device is active and registered with the telecommunications network.

2. A cellular communication device that uses a screening list configured at a computing device apart from the cellular communication device, the cellular communication device including:

a processor for:
(a) when the cellular communication device is active and registered, coordinating reception of the screening list from a network element that stores the screening list after transmission of the screening list from the computing device and before transmission of the screening list to the cellular communication device, and
(b) coordinating call handling for an incoming call in accordance with the screening list; and a memory for storing the screening list, wherein the screening list specifies the call handling.

3. The cellular communication device of claim 2 wherein the call handling depends at least in part on location of the cellular communication device.

4. The cellular communication device of claim 2 wherein the call handling depends at least in part on calling party name.

5. The cellular communication device of claim 2 wherein the call handling depends at least in part on calling party telephone number.

6. The cellular communication device of claim 2 wherein the call handling depends at least in part on time of day at which the incoming call is received.

7. The cellular communication device of claim 2 wherein the call handling depends at least in part on day at which the incoming call is received.

8. The cellular communication device of claim 2 wherein the call handling is specified to be on a call-by-call basis.

9. The cellular communication device of claim 2 wherein the call handling includes instructing a mobile switching center to play a charge acceptance announcement to a calling party.

10. The cellular communication device of claim 2 wherein the call handling includes instructing a mobile switching center to bill a calling party for the incoming call.

11. The cellular communication device of claim 2 wherein the call handling includes instructing a mobile switching center to forward the incoming call to a designated number.

12. The cellular communication device of claim 2 wherein a portion of one or more of calling party numbers is specified in the screening list as a wildcard.

13. The cellular communication device of claim 2 wherein the computing device is a personal computer, and wherein the screening list is generated by a subscriber using the personal computer.

14. The cellular communication device of claim 2 wherein the cellular communication device is a cellular telephone.

15. The cellular communication device of claim 2 wherein the network element comprises a message center.

16. In a cellular communication device, a method of using a screening list configured at a computing device apart from the cellular communication device, the method comprising:

when the cellular communication device is active and registered, receiving a screening list from a network element that stores the screening list after transmission of the screening list from the computing device and before transmission of the screening list to the cellular communication device;

storing the screening list, wherein the screening list specifies call handling;

receiving incoming call information relating to an incoming call;

comparing the incoming call information with the screening list; and responding to the incoming call in accordance with the screening list.

17. The method of claim 16 wherein the responding includes instructing a mobile switching center to refuse the incoming call.

18. The method of claim 16 wherein the responding includes instructing a mobile switching center to establish a call path for the incoming call.

19. The method of claim 16 wherein the responding includes instructing a mobile switching center to forward the incoming call to a designated number.

20. The method of claim 16 wherein the responding includes instructing a mobile switching center to play a charge acceptance announcement to a calling party.

21. The method of claim 16 wherein the responding includes instructing a mobile switching center to bill a calling party for the incoming call.

22. The method of claim 16 wherein the cellular communication device is a cellular telephone, and wherein the computing device is a personal computer.

23. The method of claim 16 wherein the network element comprises a message center.

24. A telecommunications network comprising:

a first network element for receiving and storing a screening list for a subscriber, wherein the screening list specifies call handling for the subscriber, wherein the first network element receives the screening list over a first communication channel from a computing device of the subscriber, and wherein the first network element stores the screening list for delivery to a cellular communication device of the subscriber when the cellular communication device is active and registered; and a second network element for delivering the screening list to the cellular communication device over a second communication channel when the cellular communication device is active and registered.

25. The telecommunications network of claim 24 wherein the first network element is an adjunct processor.

26. The telecommunications network of claim 24 wherein the first network element is an intelligent peripheral.

27. The telecommunications network of claim 24 wherein the second network element comprises mobile switching center.

28. The telecommunications network of claim 24 wherein preparing the screening list comprises formatting the screening list for transmission over the first communication channel.

29. The telecommunications network of claim 28 wherein the formatting the screening list comprises parsing the screening list into plural message segments.

30. The telecommunications network of claim 24 wherein the first network element comprises a message center.

31. A method of providing a screening list to a cellular communication device of a subscriber, the method comprising:

receiving a screening list for a subscriber from a computing device of the subscriber, wherein the screening list specifies call handling; and if the cellular communication device is active and registered, transmitting the screening list to the cellular communication device over a communication channel for storage of the screening list in the cellular communication device, thereby enabling the cellular communication device to direct handling of incoming calls in accordance with the screening list stored in the cellular communication device, otherwise, storing the screening list in a network element for delivery of the screening list to the cellular communication device over the communication channel when the cellular communication device is active and registered.

32. The method of claim 31 wherein the cellular communication device is a cellular telephone.

33. The method of claim 31 wherein the network element comprises a message center.

34. The method of claim 31 wherein the communication channel comprises a wireless communication channel through a mobile switching center.

35. The method of claim 31 wherein preparing the screening list comprises formatting the screening list for transmission.

36. The method of claim 35 wherein the formatting the screening list comprises parsing the screening list into plural message segments.

37. A computer-readable medium storing computer-executable instructions for causing a computing device programmed thereby to perform a method of providing a screening list, the method comprising:

receiving input indicating call handling for a screening list for a cellular communication device of a subscriber;

formatting the screening list for transmission over a first communication channel; and transmitting the screening list over the first communication channel, wherein a network element stores the screening list if necessary until the cellular communication device is active and registered, whereupon the screening list is delivered to the cellular communication device over a second communication channel.

38. The computer-readable medium of claim 37 wherein the cellular communication device is a cellular telephone, and wherein the computing device is a personal computer.

39. The computer-readable medium of claim 37 wherein the network element comprises a message center.

40. The computer-readable medium of claim 37 wherein the second communication channel comprises a wireless communication channel through a mobile switching center.

41. The computer-readable medium of claim 37 wherein the formatting the screening list comprises parsing the screening list into plural message segments.

* * * * *